(12) United States Patent
Ricket et al.

(10) Patent No.: US 11,947,661 B2
(45) Date of Patent: *Apr. 2, 2024

(54) METHOD AND SYSTEM FOR REMOTE MANAGEMENT OF ACCESS TO APPLIANCES

(71) Applicant: PayJoy Inc., San Francisco, CA (US)

(72) Inventors: Douglas James Ricket, Belmont, CA (US); Jaideep Mirchandani, Palo Alto, CA (US)

(73) Assignee: PayJoy Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,767

(22) Filed: May 10, 2022

(65) Prior Publication Data
US 2022/0261477 A1 Aug. 18, 2022

Related U.S. Application Data

(62) Division of application No. 17/153,331, filed on Jan. 20, 2021, now Pat. No. 11,354,403.

(30) Foreign Application Priority Data

Dec. 17, 2020 (MX) .................... MX/a/2020/013932

(51) Int. Cl.
*G06F 21/53* (2013.01)
*G06F 21/43* (2013.01)
(Continued)

(52) U.S. Cl.
CPC .............. *G06F 21/53* (2013.01); *G06F 21/43* (2013.01); *G06F 21/572* (2013.01);
(Continued)

(58) Field of Classification Search
CPC ........ G06F 21/53; G06F 21/43; G06F 21/572; G06F 21/575; G06Q 20/14; G06Q 20/326;
(Continued)

(56) References Cited

U.S. PATENT DOCUMENTS 5,794,142 A 8/1998 Vanttila et al.
6,023,620 A 2/2000 Hansson
(Continued)

OTHER PUBLICATIONS

Chatterjee, Sumona. "Best 9 ways to Fix iPhone Cellular Data Not Working", Jun. 1, 2018. <https://medium.com/@sumona7chatterjee/best-9-ways-to-fix-iphone-cellular-data-not-working-2a988a73c3b1> (Year: 2018).*
(Continued)

*Primary Examiner* — Michael Simitoski
(74) *Attorney, Agent, or Firm* — Barbara B. Courtney; Dilworth & Barrese, LLP.

(57) ABSTRACT

Embodiments described herein include methods and systems for remotely managing appliances, including enabling communication between a user of the appliance and third party systems. The third party systems can include any entity that has a relationship with the user of the appliance, such as a payment infrastructure handling incremental payments for the appliance, and managing access to the appliance accordingly. In some embodiments, the appliance being controlled is a mobile phone that also includes third party operating system software. Various methods for preventing alteration or replacement of the third party operating system are also described.

11 Claims, 16 Drawing Sheets

(51) Int. Cl.
*G06F 21/57* (2013.01)
*G06Q 20/14* (2012.01)
*G06Q 40/03* (2023.01)
*G16Y 40/30* (2020.01)
*G16Y 40/50* (2020.01)

(52) U.S. Cl.
CPC ........... *G06F 21/575* (2013.01); *G06Q 20/14* (2013.01); *G06Q 40/03* (2023.01); *G16Y 40/30* (2020.01); *G16Y 40/50* (2020.01)

(58) Field of Classification Search
CPC .... G06Q 20/3263; G06Q 40/03; G16Y 40/30; G16Y 40/50
See application file for complete search history.

(56) References Cited

U.S. PATENT DOCUMENTS

| | | | |
|---|---|---|---|
| 6,029,065 | A | 2/2000 | Shah |
| 6,430,406 | B1 | 8/2002 | Frisk |
| 7,634,565 | B2 | 12/2009 | Goffin |
| 8,117,123 | B1 | 2/2012 | Gailloux |
| 8,335,739 | B1 | 12/2012 | Bol |
| 8,355,805 | B2 | 1/2013 | Ricket |
| 8,489,481 | B2 | 6/2013 | Moore |
| 8,483,658 | B1 * | 7/2013 | Lindemann ............. H04W 4/24 455/408 |
| 2001/0044893 | A1 | 11/2001 | Skemer |
| 2002/0101966 | A1 | 8/2002 | Nelson |
| 2003/0018892 | A1 | 1/2003 | Tello |
| 2003/0056107 | A1 | 3/2003 | Cammack |
| 2003/0149662 | A1 | 8/2003 | Shore |
| 2004/0083275 | A1 | 4/2004 | Strisower |
| 2004/0205164 | A1 | 10/2004 | Jacobs et al. |
| 2005/0170813 | A1 | 8/2005 | Choi |
| 2006/0135208 | A1 | 6/2006 | Lee |
| 2008/0162159 | A1 | 7/2008 | Wang |
| 2008/0256605 | A1 | 10/2008 | Malinen |
| 2009/0002333 | A1 | 1/2009 | Maxwell |
| 2009/0292926 | A1 | 11/2009 | Daskalopoulos |
| 2010/0011200 | A1 | 1/2010 | Rosenan |
| 2010/0015942 | A1 | 1/2010 | Huang |
| 2011/0076981 | A1 | 3/2011 | Singh |
| 2011/0254687 | A1 | 10/2011 | Arponen |
| 2011/0288992 | A1 | 11/2011 | Needham |
| 2012/0106726 | A1 | 5/2012 | Hillier et al. |
| 2012/0184307 | A1 | 7/2012 | Van Velsen |
| 2013/0132854 | A1 | 5/2013 | Raleigh |
| 2013/0185194 | A1 | 6/2013 | Moore |
| 2013/0182693 | A1 | 7/2013 | Sperling et al. |
| 2013/0290542 | A1 | 10/2013 | Watt |
| 2014/0006555 | A1 | 1/2014 | Shields |
| 2014/0057597 | A1 | 2/2014 | Velusamy |
| 2014/0236366 | A1 | 8/2014 | Livadaras |
| 2014/0372743 | A1 | 12/2014 | Rogers |
| 2014/0382843 | | 12/2014 | Rogers |
| 2015/0099483 | A1 | 4/2015 | Vetaal |
| 2015/0149992 | A1 | 5/2015 | Wade |
| 2015/0180746 | A1 | 6/2015 | Day, II |
| 2016/0205493 | A1 | 7/2016 | Ricket |
| 2017/0220330 | A1 | 8/2017 | Soini |
| 2017/0230515 | A1 | 8/2017 | Velusamy |
| 2017/0325111 | A1 | 11/2017 | Reese |
| 2017/0353858 | A1 | 12/2017 | Krishna |
| 2018/0165101 | A1 | 6/2018 | Bulusu |
| 2018/0253719 | A1 | 9/2018 | Urquhart |
| 2018/0260569 | A1 | 9/2018 | Sutton |
| 2018/0367677 | A1 | 12/2018 | Velusamy |
| 2019/0266331 | A1 | 8/2019 | Sanchez Diaz |
| 2020/0296196 | A1 | 9/2020 | Cohen |
| 2020/0409869 | A1 | 12/2020 | Simmons |
| 2021/0021702 | A1 | 1/2021 | Gudivada |

OTHER PUBLICATIONS

PayPal. "Add money to your PayPal account with PayPal Cash", Sep. 12, 2018. <https://web.archive.org/web/20180912054917/https://www.attheregister.com/paypalcash>. (Year: 2018).*

Rahman, Mishaal. "This app lets banks lock your financed phone if you default on payment", Nov. 6, 2020. <https://www.xda-developers.com/google-device-lock-controller-banks-payments/>. (Year: 2020).*

Safaricom. "FAQs: LIPA Mdogo Mdogo", Dec. 8, 2020. <https://web.archive.org/web/20201208145202/https://www.safaricom.co.ke/faqs/faq/750>. (Year: 2020).*

Patent Cooperation Treaty; PCT Application No. PCT/US2017/020290; "Notification Concerning Transmittal of International Preliminary Report on Patentability"; dated Sep. 4, 2018.

Rosendhal, A., J. F. Hampe and G. Botterweck, "Mobile Home Automation—Merging Mobile Value Added Services and Home Automation Technologies," International Conference on the Management of Mobile Business (ICMB 2007), Toronto, Ont., 2007, pp. 31-31, doi: 10.1109/ICMB.2007.47.

Gupta, Sidhant, Matthew S. Reynolds, and Shwetak N. Patel. 2010. ElectriSense: single-point sensing using EMI for electrical event detection and classification in the home. In Proceedings of the 12th ACM international conference on Ubiquitous computing (UbiComp '10). ACM, New York, NY, USA, 139-148. DOI=http://dx.doi.org/10.1145/1864349.1864375.

Techopedia.com, Operating System (OS), https://www.techopedia.com/definition/3515/ operating-system-os, Sep. 30, 2011.

Gupta, Sidhant. ElectriSense: Single-Point Sensing Using EMI for Electrical Event Detection and Classification in the Home. University of Washington. ProQuest Dissertations Publishing, 2014.

Chatterjee, Sumona. "Best 9 ways to Fix iPhone Cellular Data Not Working", Jun. 1, 2018. https://medium.com/@sumona7chatterjee/best-9-ways-to-fix-iphone-cellular-data-not-working-2a988a73c3b1.

Paypal, "Add money to your PayPal account with PayPal Cash", Sep. 12, 2018. https://web.archive.org/web/20180912054917/https://www.attheregister.com/paypalcash.

Rahman, Mishaal, "This app lets banks lock your financed phone if you default on payment", Nov. 6, 2020. https://www.xda-developers.com/google-device-lock-controller-banks-payments/.

Safaricom, "FAQs: LIPA Mdogo Mdogo", Dec. 8, 2020. https://web.archive.org/web/20201208145202/https://safaricom.co.ke/faqs/faq/750.

Botterweck, Goetz et al., "Mobile home automation; merging mobile value added services and home automation technologies", Information Systems and eBusiness Management. Heidelberg. vol. 7. Issue 3. Jun. 2009. pp. 275-299.

* cited by examiner

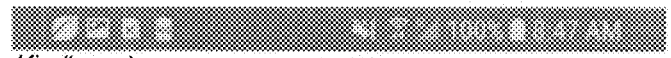
Kindly make your payments at the nearest PayJoy store. You must be connected to the Internet after you make a payment to ensure that your credit is updated.
Don't have access to Internet but you've made a payment? Contact support to get a code to update your credit
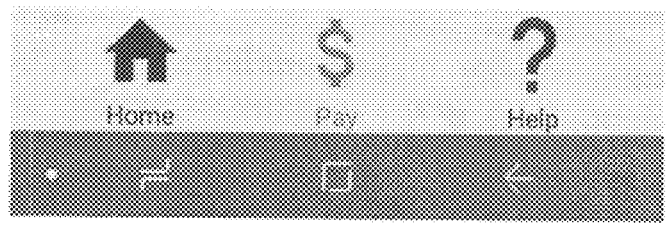
FIG. 12

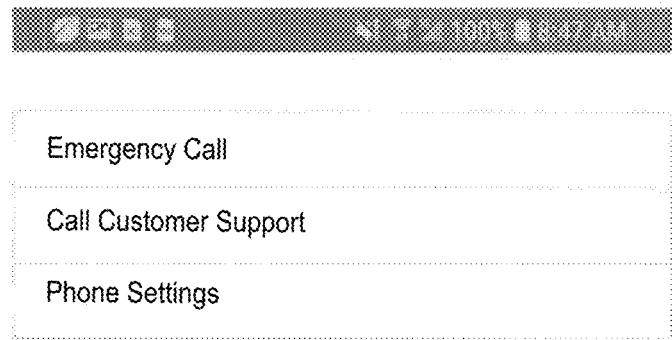
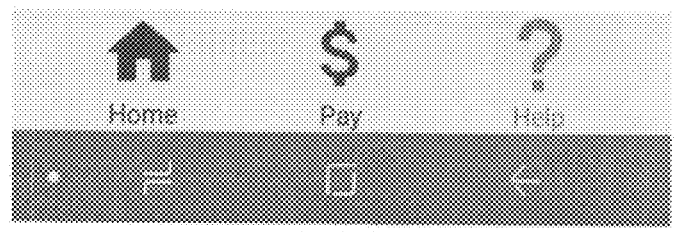
FIG. 13

METHOD AND SYSTEM FOR REMOTE MANAGEMENT OF ACCESS TO APPLIANCES

BACKGROUND

User devices such as consumer electronics and home appliances are often sold as a single up-front purchase. For example, a television may be sold in a retail shop for $200 to a consumer, who then owns the television and takes it home. However, some people would prefer to pay for a device over time, for example with monthly payments of $20 per month, either for a limited number of payments, or for as long as the device is in use.

Several systems exist to help the seller continue to receive payments after the buyer has walked away with the television (or other device or appliance). In one prior system, multiple hardware units are required to be connected to the device (or to multiple devices), including a unit for controlling the device, and another unit for managing usage (e.g., receiving and tracking payments). Yet other systems use a mobile communication network that facilitates electronic payment verification. However such systems also require the device itself to have mobile communication capability in order to be controlled.

It is desirable to have a method and system for remote management of devices that is easy and economical to deploy, and assists in assuring that required payments are timely made to the seller of the devices.

BRIEF DESCRIPTION OF THE DRAWINGS

FIG. 12 is a screenshot illustrating a capability of one embodiment.

FIG. 13 is a screenshot illustrating a capability of one embodiment.

DETAILED DESCRIPTION

Embodiments described herein include a system that executes a device or appliance management method. As used herein "appliance" means any electronic device that might be typically purchased by a user. Appliances include, but are not limited to: a television, refrigerator, freezer, clothes washing machine, dish washing machine, electric stove, microwave oven, blender, food processor, air conditioner, stereo system, camera, video recorder, mobile phone, laptop computer, desktop computer, tablet computer, printer, DVD player, video projector, motorcycle, automobile, or airplane.

For purposes of describing the embodiments that are claimed, an example is given of controlling, activating, or deactivating an appliance based on whether scheduled payments are made. But this is only one example of the need for a third party (such as a payment entity that manages accounts on behalf of the seller of the user device) to easily and remotely control access to the appliance by the user, or even the manner of use of the appliance.

Embodiments of the invention enable a user to possess and use a device or appliance while another party can control the use of the device or appliance. This includes the other party determining when the device can be turned on or be unavailable to be turned on. This also includes the third party determining how the device can be used, for example what channels a television can receive, or how much power a generator can produce.

Figure 1:
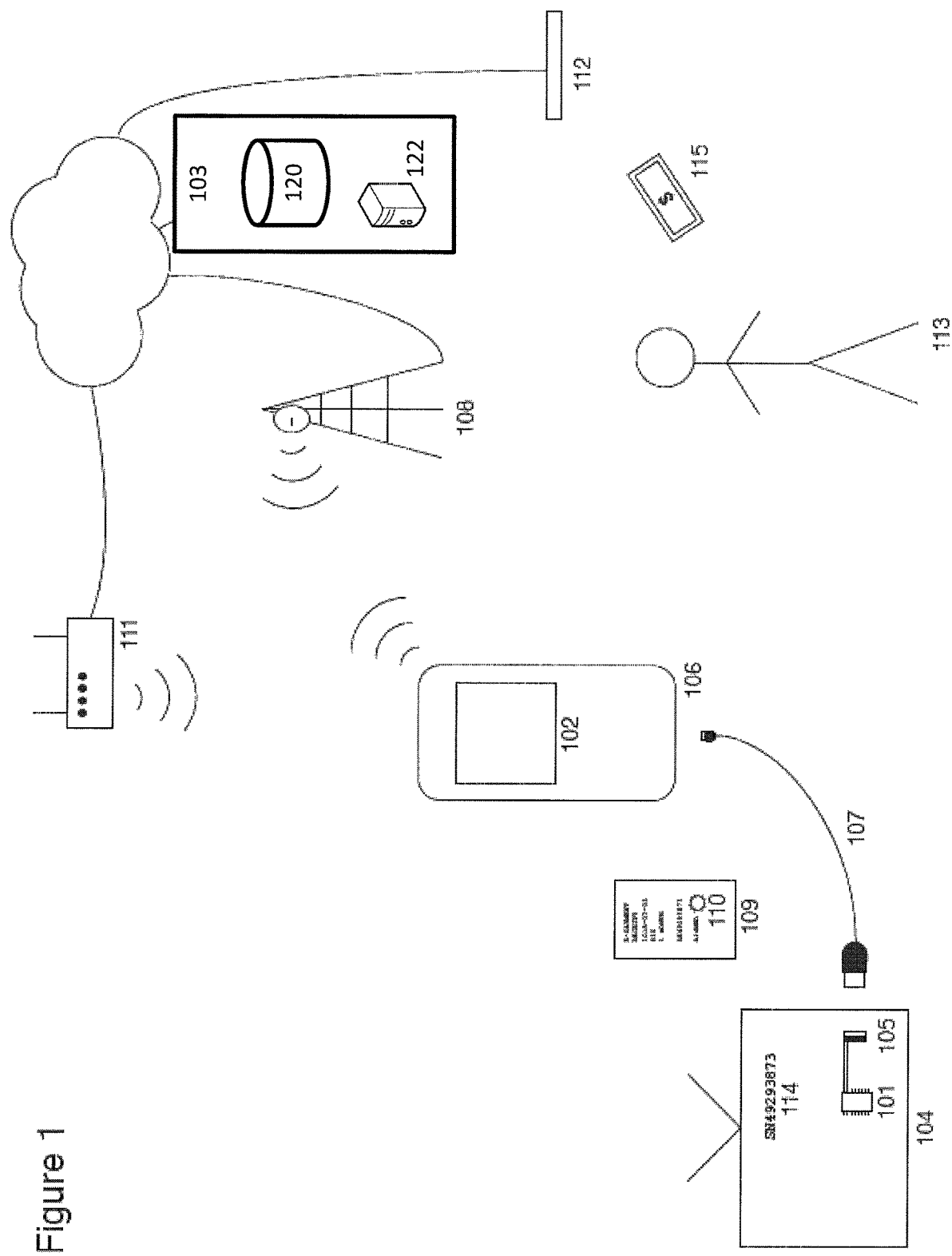
FIG. 1 is a block diagram of a remote device management system according to an embodiment.

FIG. 1 is a block diagram of an embodiment of a system for remote management of access to user appliances. An appliance 104 is activated or deactivated through an appliance management subsystem AMS 101. In an embodiment, the AMS is a hardware subsystem embedded in the appliance, such as a microcontroller or any other kind of integrated circuit (IC). In such an embodiment, the AMS 101 can be integrated into the core of the appliance so that the embedded system cannot be removed without disabling the appliance. When AMS 101 determines that the customer has paid, it activates the appliance for normal use. In other embodiments, the AMS 101 is connected after manufacture of the appliance and is not embedded. However, removal of the AMS 101 is detectable, and disabling of the appliance is a result of removal.

In an embodiment, the embedded system has no communication ability of its own except for a standard USB port 105, through which it can be connected to an internet capable device 106 through a USB cable 107. In other embodiments, various modes of communication as known in the art to enable data exchange with entities are within the scope of the invention. In one embodiment, the device 106 is a mobile phone that runs a software application (app) 102 which enables the device 106 to communicate with the AMS 101 according to methods described herein. In other embodiments, the internet capable device is a laptop computer, personal computer, tablet, PDA or any other such device.

According to an embodiment, the device 106 is a mobile phone that acts as a USB storage device. In this case, both the software app 102 and the embedded system can communicate with each other by reading and writing files on the USB storage device. In operation, the AMS 101 communicates an appliance identification (e.g., serial number) 114 to the software app 102. When the software app 102 determines that a payment has been made for the identified appliance, the software app 102 delivers a digital payment receipt 109 with a digital signature 110 to the AMS 101, and the AMS 101 activates the appliance.

In an embodiment, the software app 102 communicates using a mobile phone communication system, which may use 802.11 WiFi to communicate to a WiFi access point 111, or may use a GSM mobile data network such as 4G LTE, 3G, or 2G EDGE to communicate to a mobile carrier's signal tower 108. Either via WiFi or mobile data, the phone transmits data over the Internet to a third party infrastructure 103 that includes at least one remote device management server (RDMS) 122 that executes the methods described herein. The third party infrastructure 103 further includes storage devices 120 for storing current and historical data regarding multiple devices under remote control, as well as customer personal and financial data.

The third party infrastructure 103 can be any Internet-based system with which the user or customer 113 establishes a relationship for the purpose of establishing control of the appliance 104 through wireless communication from the third party infrastructure 103 to the device 106, and from the device 106 to the AMS 101. The servers 122 and data storage devices 120 are shown as single entities in a discrete location. Actually, the servers 122 and storage devices 120 represent multiple servers and storage devices that can be distributed across a network in any fashion. The servers 122 include multiple processors that execute the methods described herein. In this disclosure, the third party infrastructure is described as a payment infrastructure, and control of the appliance is based on the status of the customer 113 payment account (which is conveyed from the third party infrastructure 103 to the user device 106, and then to the AMS 101). However, the basis of the relationship between the user or customer 113 and the third party infrastructure, and the events or motives that control the appliance could have nothing to do with payments. For example, the system can also be employed by parents to control various appliances used by children. But for purposes of illustration, the third party infrastructure 103 will be referred to as a payment infrastructure herein.

In an embodiment, the third party infrastructure 103 is a software service running on computer servers. It tracks when a payment is made for a particular appliance in addition to managing the appliance. The payment infrastructure 103 communicates with a payment provider 112 that collects cash or electronic payments 115 from customers 113. For example, the payment provider could be PayPal, a company that manages electronic payments; or the payment provider could be a mobile-money service such as M-Pesa; or the payment provider could be a bank or Western Union, which allows customers to deposit cash at a retail location and have that cash credited to an electronic account. The payment aspect is not considered a novel or limiting aspect of embodiments. Rather the event of payment causes the system to execute the remote management method; including activating or deactivating the appliance 104.

Figure 2:
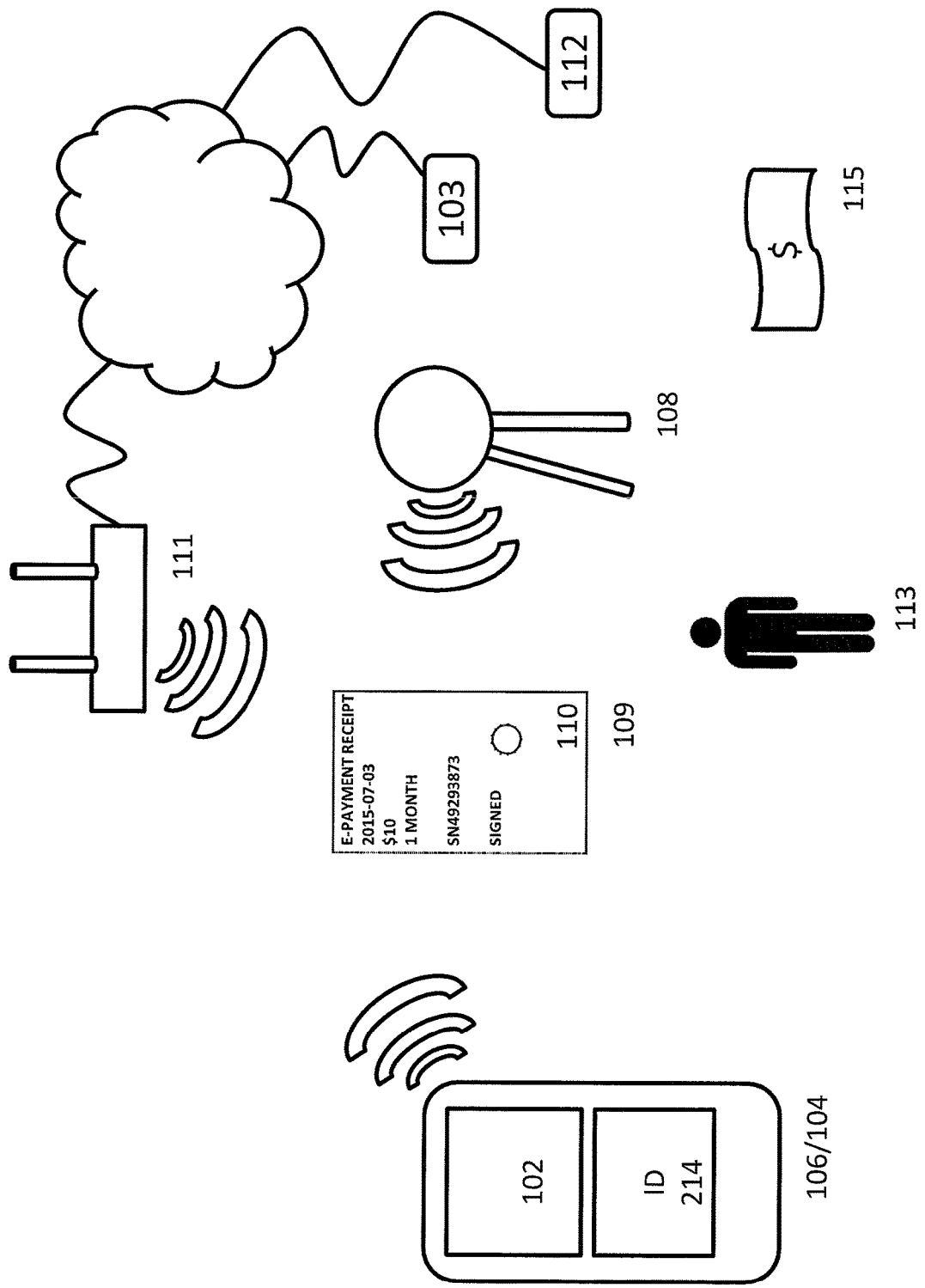
FIG. 2 is a block diagram of a remote device management system according to an embodiment.

FIG. 2 is a block diagram of an embodiment in which the device 106 is also the appliance 104. For example, device 106 can be a mobile phone that is managed remotely using software app 102 in a similar manner to that described with reference to FIG. 1. However, the software/hardware/firmware of the device 106/104 itself is used to activate or deactivate the device 106/104. Essentially, the AMS is software added to the operating system of the device 106 (or the operating system itself). Again, when payments 115 are made by a user 113, and accepted by payment infrastructure 103, the payment infrastructure 103 delivers a digital payment receipt 109 with a digital signature 110 to the software app 102, which verifies it, and controls the device 106/104 accordingly.

Figure 3:
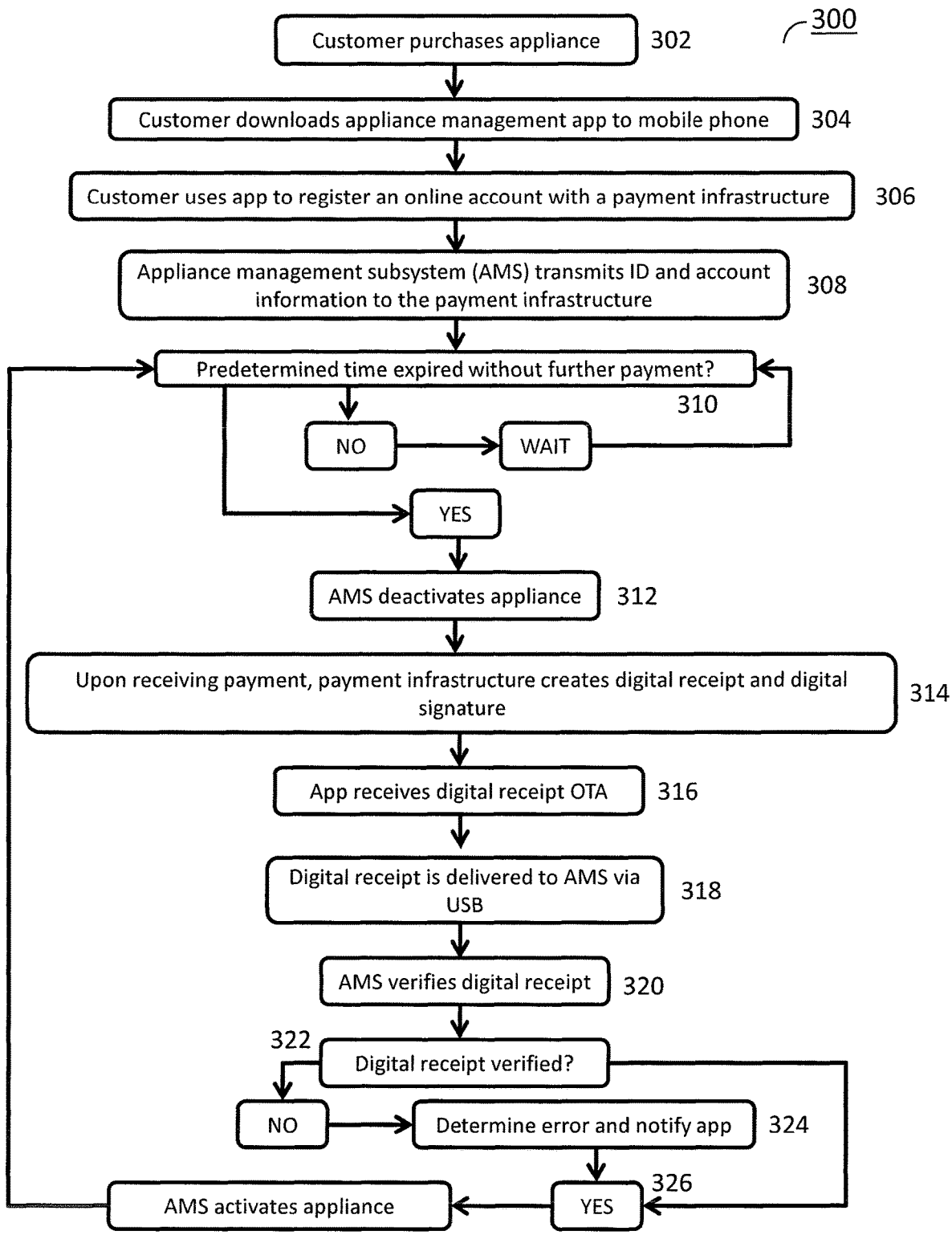
FIG. 3 is a flow diagram of a remote device management method according to an embodiment.

FIG. 3 is a flow diagram illustrating a method 300 for remote appliance management according to an embodiment like that of FIG. 1. At 302, a user or customer purchases an appliance from a vendor. At 304, the customer downloads the appliance management software app (102) to his or her device (106). At 306, the customer uses the software app to register an online account with a payment infrastructure (103). At 308, the AMS subsystem transmits an ID and account information to the user of the device 106 (via a USB cable in one embodiment), and the device transmits the information to the payment infrastructure.

At 310, the software app determines whether a predetermined period of time has passed without the customer submitting further payment (after some initial payment upon acquiring the appliance. As an example, the period of time can be one month. If the period of time has not passed, the process continues to check for the expiration of the time period. If the period of time has passed without further payment, the AMS causes the appliance to be deactivated at 312. Deactivation means the appliance is not usable, or that certain predetermined features of the appliance are not usable. Deactivation can mean powering the appliance off, or disabling predetermined features.

At 314, if and when the payment is submitted to the payment infrastructure, the payment infrastructure creates a digital receipt including the ID information and a digital signature. The software app receives the digital receipt over-the-air at 316. At 318, the digital receipt is delivered to the AMS via USB cable. As previously described, the use of a USB cable is not necessary to effectuate the novel invention. Other methods are within the scope of the invention to communicate with other elements of the system. At 320, the AMS attempts to verify the digital receipt and determines (at 322) whether verification was successful. If the verification was not successful, the nature of the error is determined, and an error message is sent to the software app at 324.

If the verification of the digital receipt is successful, the AMS activates the appliance at 326. Activation means re-enabling any features or functions that were disabled at 312. The process then returns to 310 to wait for the expiration of the next time period.

In other embodiments, the time period can be set to be less than one month or more than one month. In other embodiments, the device 106 may communicate with the AMS via Bluetooth, WiFi, DTMF sounds, light modulation, 2D barcode or 3D barcode. The AMS 101 may include standard hardware as built originally in the appliance, but with customized firmware (software running on an embedded microprocessor).

Embodiments further include various user interfaces presented to the user via a mobile phone, or any other Internet connected device. The user interface can provide full information regarding the customer account, such as how much time is left before the appliance will be disabled. In addition, any information about the customer's financial account is available to the customer. This includes an overview of multiple devices that have been financed according to the embodiments described, and a single online point through which clients can manage their accounts and also manage their devices (e.g., turning the devices on and off).

Figure 4:
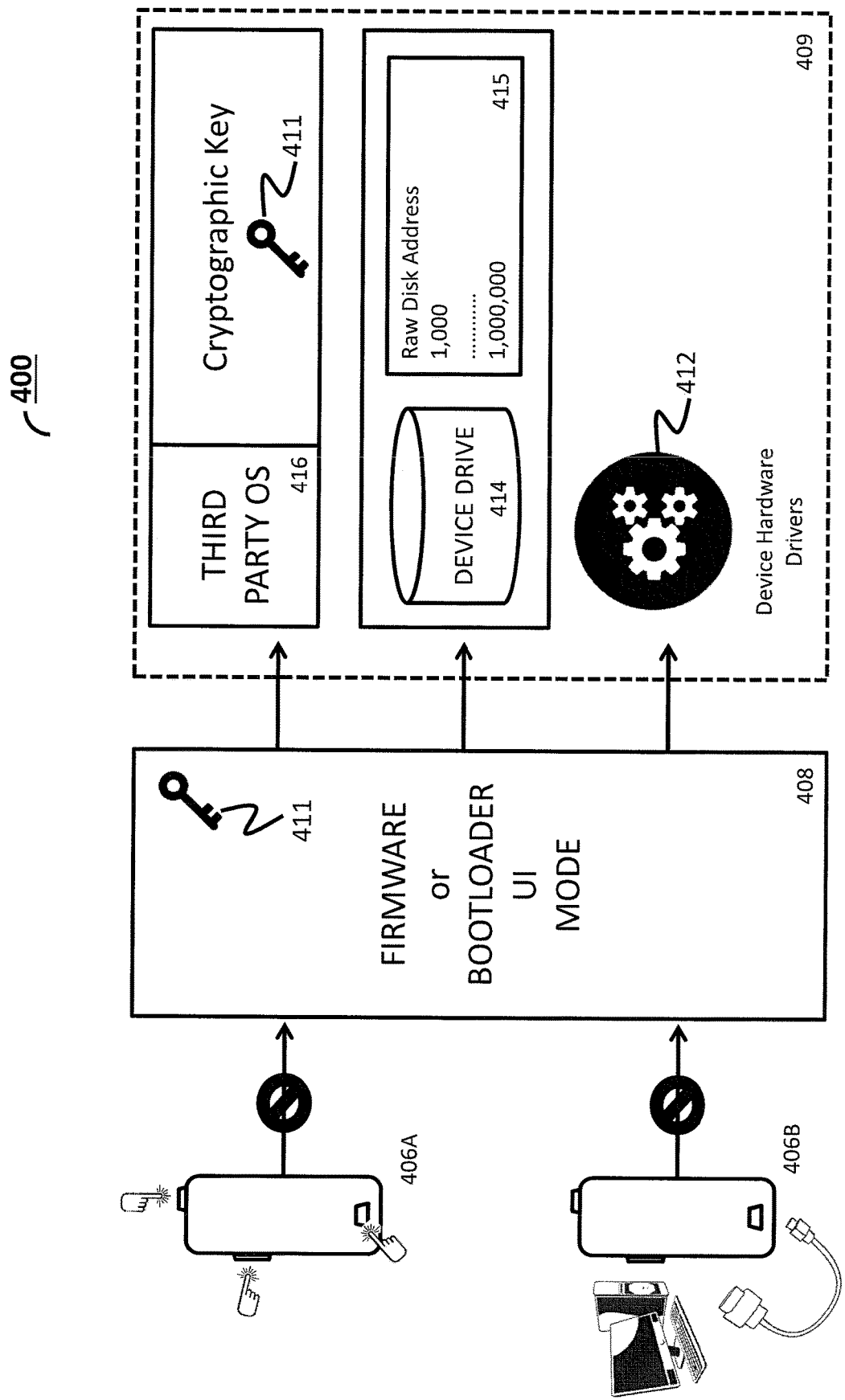
FIG. 4 is a block diagram of a system in which the appliance being controlled, and further illustrating a method of preventing tampering with control software on the mobile phone.

FIGS. 4-8 are block diagrams system illustrating appliance management system configurations. In the embodiments of FIGS. 4-8, the appliance being controlled is a mobile phone that also includes the controller software (such as app 102). Methods for preventing tampering with the controller software are also illustrated. Referring first to FIG. 4, an appliance management system 400 includes devices 406A and 406B, which are mobile phones that are variously configurable as described below. A bootloader (or bootloader program) is a software component of a computing device that runs early in the power-on process. An example is a BIOS (built in operating system) in a PC. Mobile phones have analogous systems. In embodiments, the software app 102 is part of an operating system OS 416 that operates a device 406. The OS 416 is installed onto the device 406 through the bootloader "flashing" mechanism (via a bootloader user interface mode 408), which allows users to customize their OS, or install a new OS. As part of the installation of the OS 416, the bootloader is "locked" to prevent any further re-flashing, which could be used to uninstall the OS 416.

As further described below, various methods for locking the bootloader include:
- altering the bootloader program binary code to prevent the bootloader from receiving or validating new software packages;
- altering the operating system files to make them unrecognizable to the bootloader, while maintaining functionality for the user;
- altering the storage system drivers so the bootloader is unable to write any new data files;
- modifying the memory addresses for the storage system for the embedded memory chip in the device so the bootloader write operations have no effect on the actual device; and
- when a bootloader program supports a "lock" command, engaging the built in lock, and additionally disabling the bootloader's "unlock" command by one of: altering the software function calling method of the "unlock" command so it fails to engage when called with the original method; or altering the cryptographic keys or adding new cryptographic keys required by the "unlock" command.

With further reference to FIG. 4, devices 406A and 406B are mobile phones that are shown attempting to enter a bootloader user interface mode 408 by different methods.

The bootloader interface mode 408 is a mode in which an operating system or some other system software can be installed on a device. Operating system software or other system software can also be altered in this mode.

Mobile phone 406A shows a hardware key (or button) pattern or combination, that when simultaneously pressed, allows the user to access the bootloader user interface mode 408. Mobile phone 406B shows an alternate method of accessing the bootloader user interface mode 408. As shown in 406B, a USB cable is attached to the device 406B and connected to a computer which allows the uploading of files to the device 406B, and alteration of 406B device settings and firmware settings.

Various device hardware and software components 409 are accessible on the device 406 when the device 406 enters the bootloader user interface mode 408. The components 409 include device hardware drivers 412, and a device drive 414 with an associated addressing scheme 415. The components 409 further include an operating system (OS), and a cryptographic key used to control access to the OS. A cryptographic key 411 is located in the device 406 firmware 411. Another cryptographic key 411 is embedded in the third party OS 416 file. These keys must match before a new OS may be installed on a device 406.

In an embodiment, a third party OS 416 is loaded to the device 406 via the bootloader user interface mode 408. In an embodiment, the third party OS 416 includes at least all of the executable functionality of software app 102 as previously described. In various embodiments, the alteration of the OS 416 or its functionality is prevented by various methods.

As shown in FIG. 4, access to the bootloader user interface mode 408 is disabled. In an embodiment, the bootloader program binary code is altered to prevent the bootloader from receiving or validating new software packages.

Figure 5:
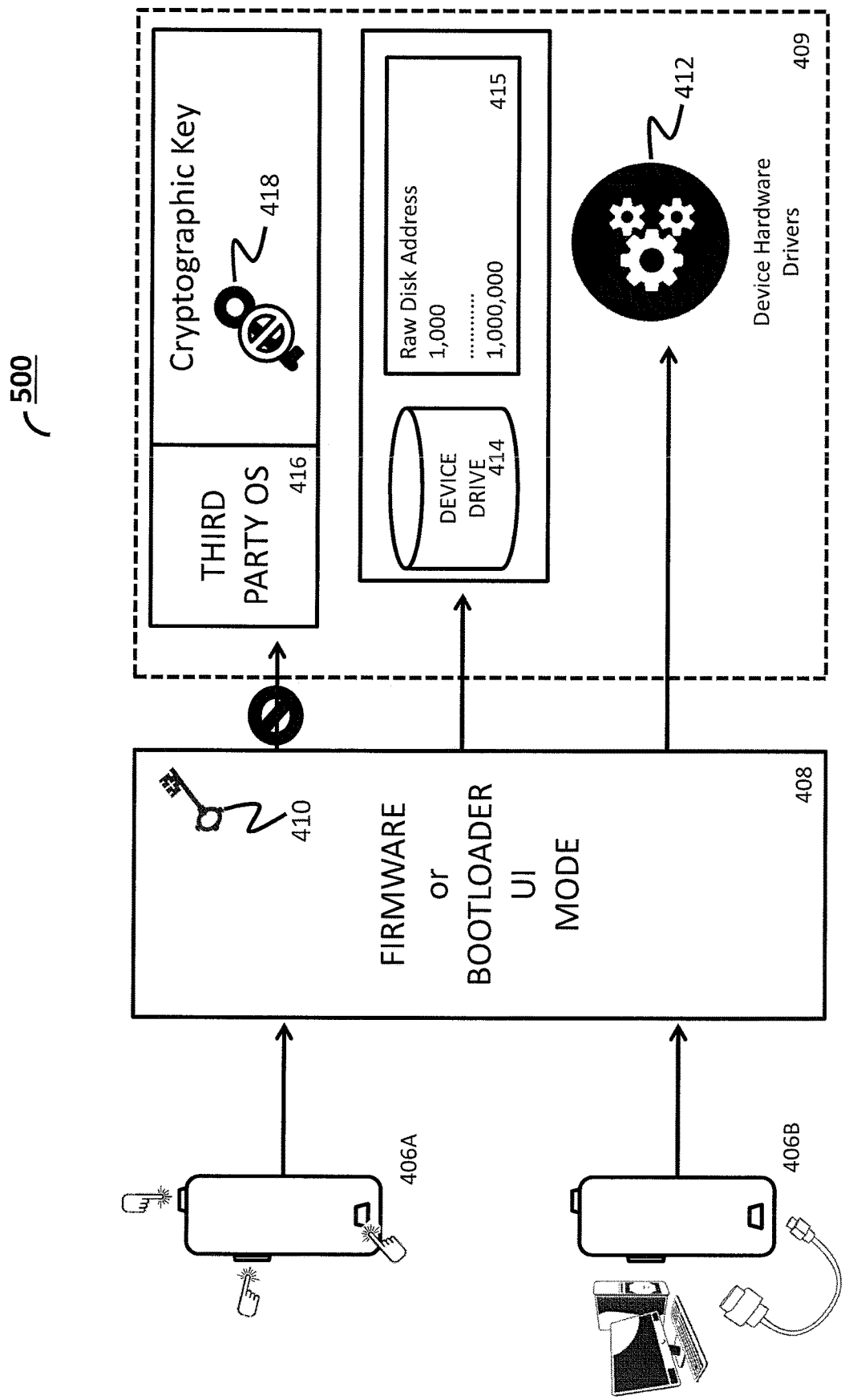
FIG. 5 is a block diagram of a system in which the appliance being controlled, and further illustrating a method of preventing tampering with control software on the mobile phone.

FIG. 5 is a block diagram of a system 500 illustrating a situation in which the appliance being controlled is a mobile phone that also includes the controller software/hardware.

Devices 406A and 406B are mobile phones that are shown entering a bootloader user interface mode 408 by different methods.

The bootloader interface mode 408 is a mode in which an operating system or some other system software can be installed on a device. Operating system software or other system software can also be altered in this mode.

Mobile phone 406A shows a hardware key (or button) pattern or combination, that when simultaneously pressed, allows the user to access the bootloader user interface mode 408. Mobile phone 406B shows an alternate method of accessing the bootloader user interface mode 408. As shown in 406B, a USB cable is attached to the device 406B and connected to a computer which allows the uploading of files to the device 406B, and alteration of 406B device settings and firmware settings.

Various device 406 hardware and software components 409 are accessible when the device 406 enters the bootloader user interface mode 408. The components 409 include device hardware drivers 412, and a device drive 414 with an associated addressing scheme 415. The components 409 further include an operating system (OS), and a cryptographic key used to control access to the OS. In an embodiment, a third party OS 416 is loaded to the device 406 via the bootloader user interface mode 408. In an embodiment, the third party OS 416 includes at least all of the executable functionality of software app 102 as previously described. In various embodiments, the alteration of the OS 416 or its functionality is prevented by various methods. As shown in FIG. 5, bootloader user interface mode 408 is accessed using the methods referred to with reference to devices 406A and 406B.

When bootloader software supports a "lock" command, a cryptographic key 410 is located in the device 406 firmware. Another cryptographic key 418 is embedded in an OS file. In order to prevent undesired access to the third party OS 416, the device cryptographic key is changed to a new, unpublished cryptographic key 410. A person wishing to download an altered OS file to a device 406, will be unable to because the new OS cryptographic key 418 will not match unpublished device cryptographic key 410.

In other embodiments in which the bootloader software supports a "lock" command, the built in lock is engaged, and additionally the bootloader's "unlock" command is disabled by preventing the bootloader program from executing an "unlock" command call. In an embodiment, this is accomplished by altering the software function calling method of the "unlock" command so it fails to execute when called with the original method of the bootloader program.

Figure 6:
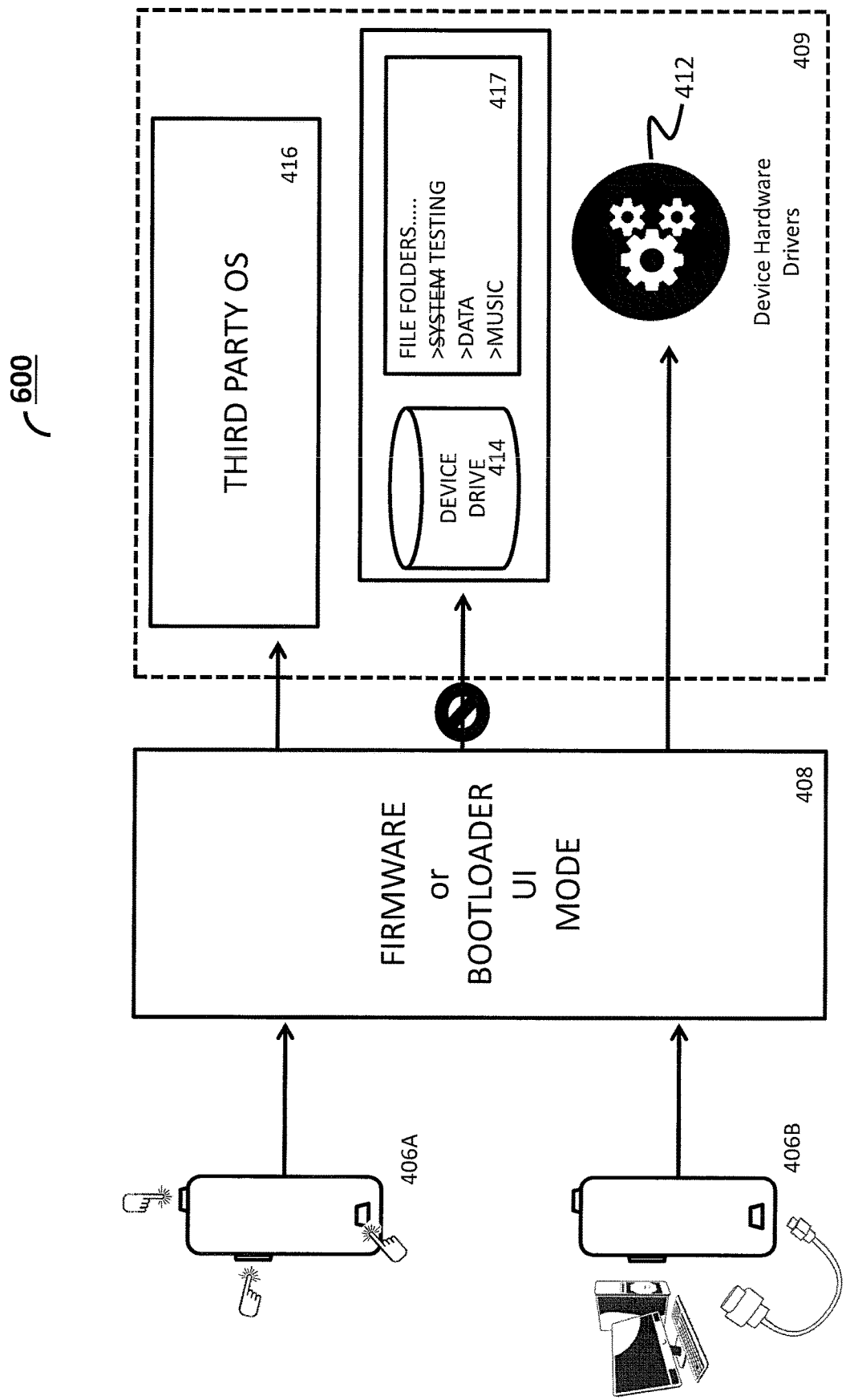
FIG. 6 is a block diagram of a system in which the appliance being controlled, and further illustrating a method of preventing tampering with control software on the mobile phone.

FIG. 6 is a block diagram of a system 600 illustrating another method of preventing alteration of the device OS or device OS functions in a system similar to that of FIGS. 4, 5, and 7-8. When a bootloader receives a new OS file, it determines how to integrate the new OS file into the existing OS. This integration may happen by overwriting certain files or folders 417 on the device drive 414. To prevent this overwriting, the third party OS 416 reconfigures files and file folder names so that they do not match the files or folder names intended to be overwritten by an undesired "new" OS. Device functionality is completely maintained otherwise. For example, as shown in 417, a folder "system" can be changed to a folder "testing".

Figure 7:
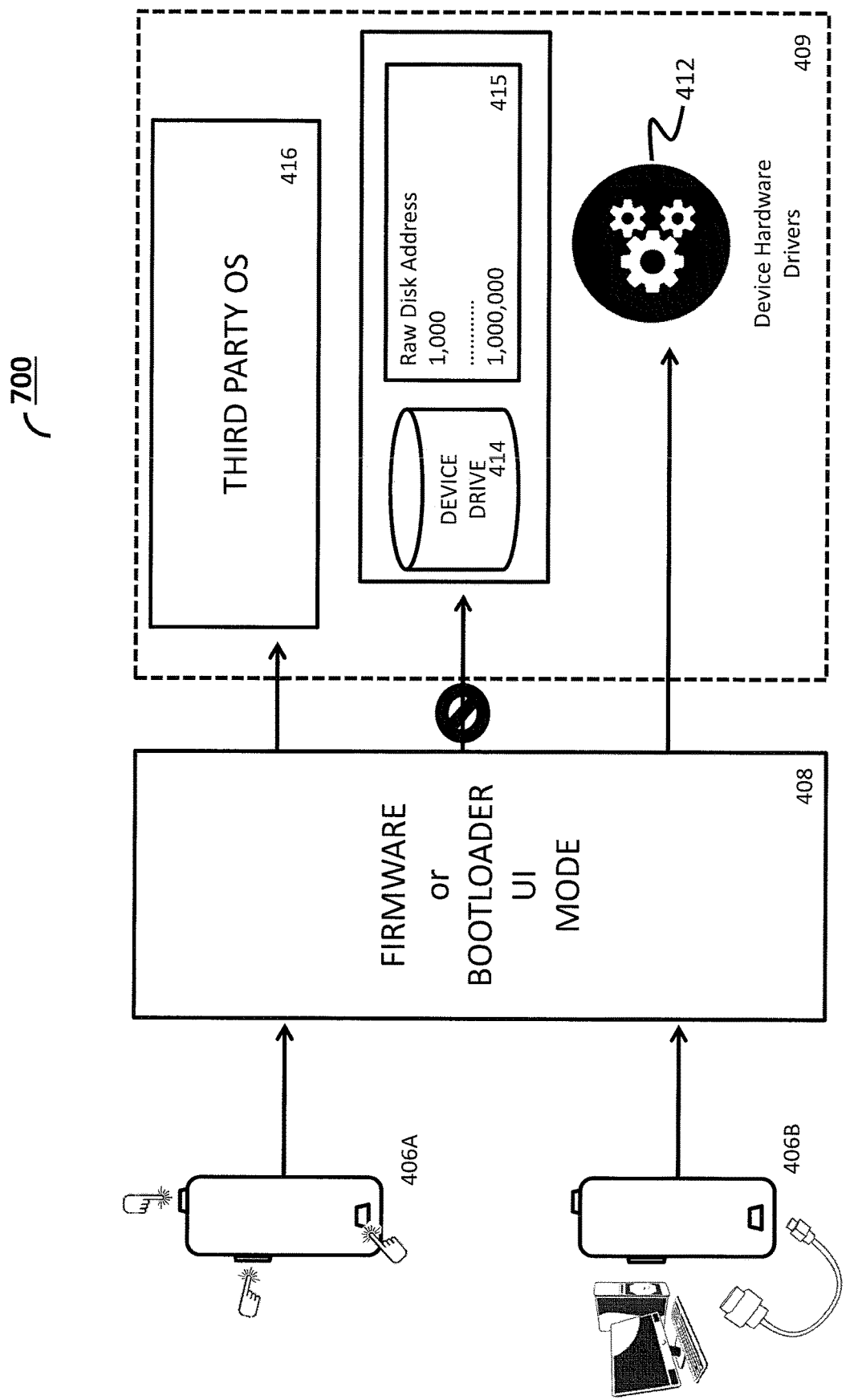
FIG. 7 is a block diagram of a system in which the appliance being controlled, and further illustrating a method of preventing tampering with control software on the mobile phone.

FIG. 7 is a block diagram of a system 700 illustrating another method of preventing alteration of the device OS or device OS functions in a system similar to that of FIGS. 4-6, and 8. When a bootloader receives a new OS file, it determines how to integrate the new OS file into the existing OS. This integration may happen by overwriting certain files or folders at certain raw disk (physical) addresses 415 on the device drive 414. To prevent this overwriting, the third party OS 416 renumbers raw disk addresses so that they do not match the intended overwrite location(s) designated by an undesired "new" OS. Device functionality is completely maintained otherwise.

Figure 8:
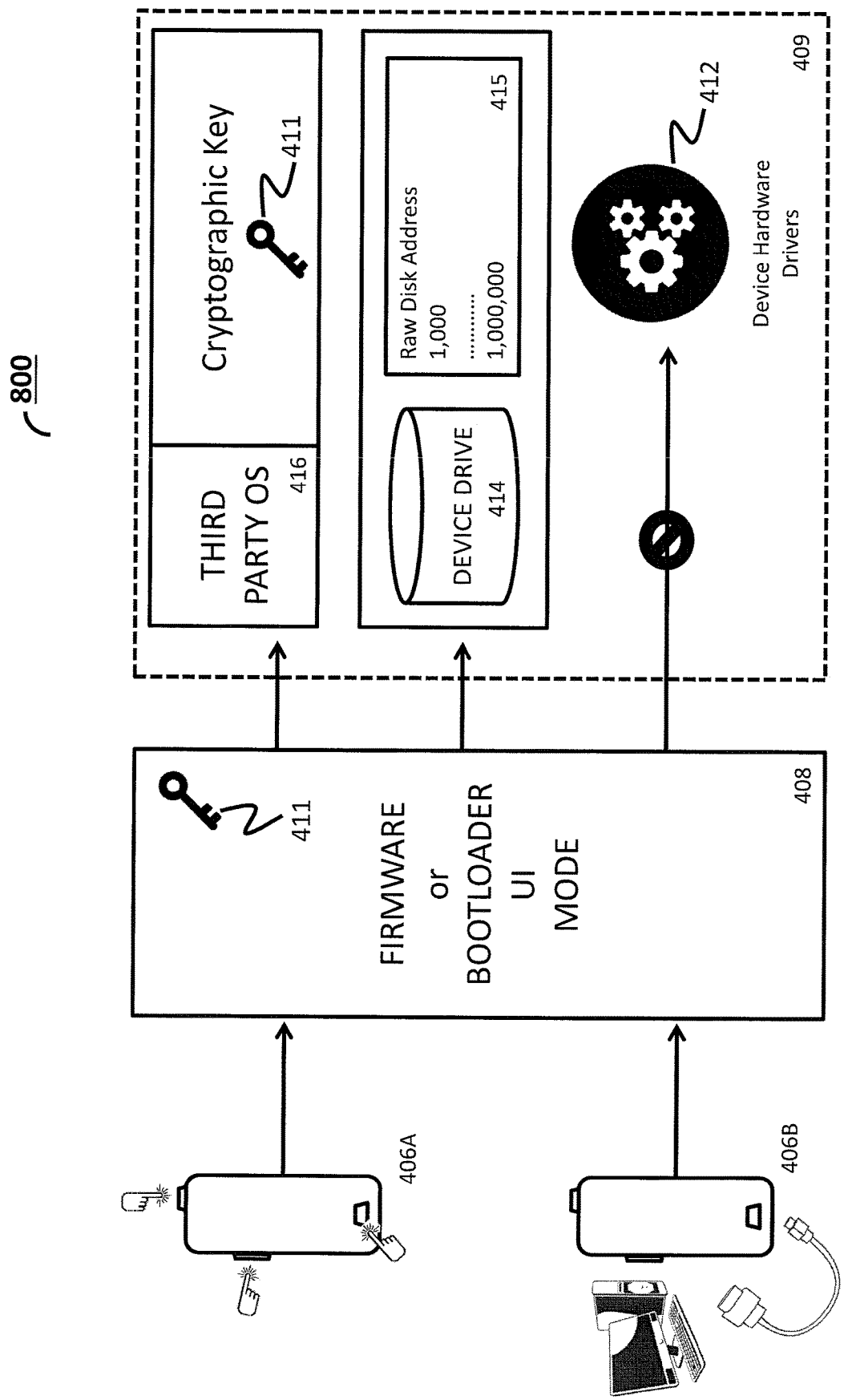
FIG. 8 is a block diagram of a system in which the appliance being controlled, and further illustrating a method of preventing tampering with control software on the mobile phone.

FIG. 8 is a block diagram of a system 800 illustrating another method of preventing alteration of the device OS or device OS functions in a system similar to that of FIGS. 4-7. An embodiment contemplates a situation in which a device user intends to obtain read/write access to the device drive 414 (e.g., to overwrite the OS 416) by altering the device hardware drivers 412. To prevent this, the device hardware drivers 412 are modified to disallow control of the device's various hardware components via the bootloader user interface mode 408. In this way, the user wishing to overwrite the OS 416 will not be able to gain read/write access to the device drive 414.

In yet other embodiments, the remote device management system described herein enables financing modes. In one such embodiment, consumers obtain credit by turning a smartphone into collateral for:
(a) Smartphone financing, or
(b) In general, any exchange that requires collateral. For instance, this can take the form of a loan where the option to control the device is sufficient collateral for the finance provider.

A smartphone can become collateral-on-demand; that is, at any point when a user (consumer, merchant, other entity in control of the phone) wants the smartphone to become collateral. As a result, this enables a new kind of technology-based business model for lending. Specifically, a user is able to offer software control of their existing smartphone as collateral. Unlike traditional lending where some kind of physical or monetary collateral is required, a smartphone can be offered as collateral without actually having to cede the smartphone or lose the ability to use it. Once the loan is fully paid, the software need not exert control of the device.

In effect, this enables lenders to reach new sets of users. Lenders can take more risk to offer capital to users who would not otherwise qualify for credit (because these users often do not have other, highly valued collateral to offer). As a result, large numbers of users could get access to credit that they would not typically qualify for (because they would be unable to offer other forms of acceptable collateral).

As an example, the end-user ("user") typically starts the operation to offer the device as collateral. The user's consent to offer the device triggers various software components to run, in order to "control the device". The user may access a mobile phone app user interface 907 to initiate the process in one of two ways. The user can either:
1. Download a Security App from a public app store like the Google Play Store or direct from another website such as payjoy.com. The user then agrees to offer the phone as collateral, and the security app then updates a Control Data Block to mark the phone as secured.
2. Additionally, on device boot, a privileged app checks with a server, and if the server specifies that the device should be controlled, then the privileged app will automatically install the security app.

Figure 9:
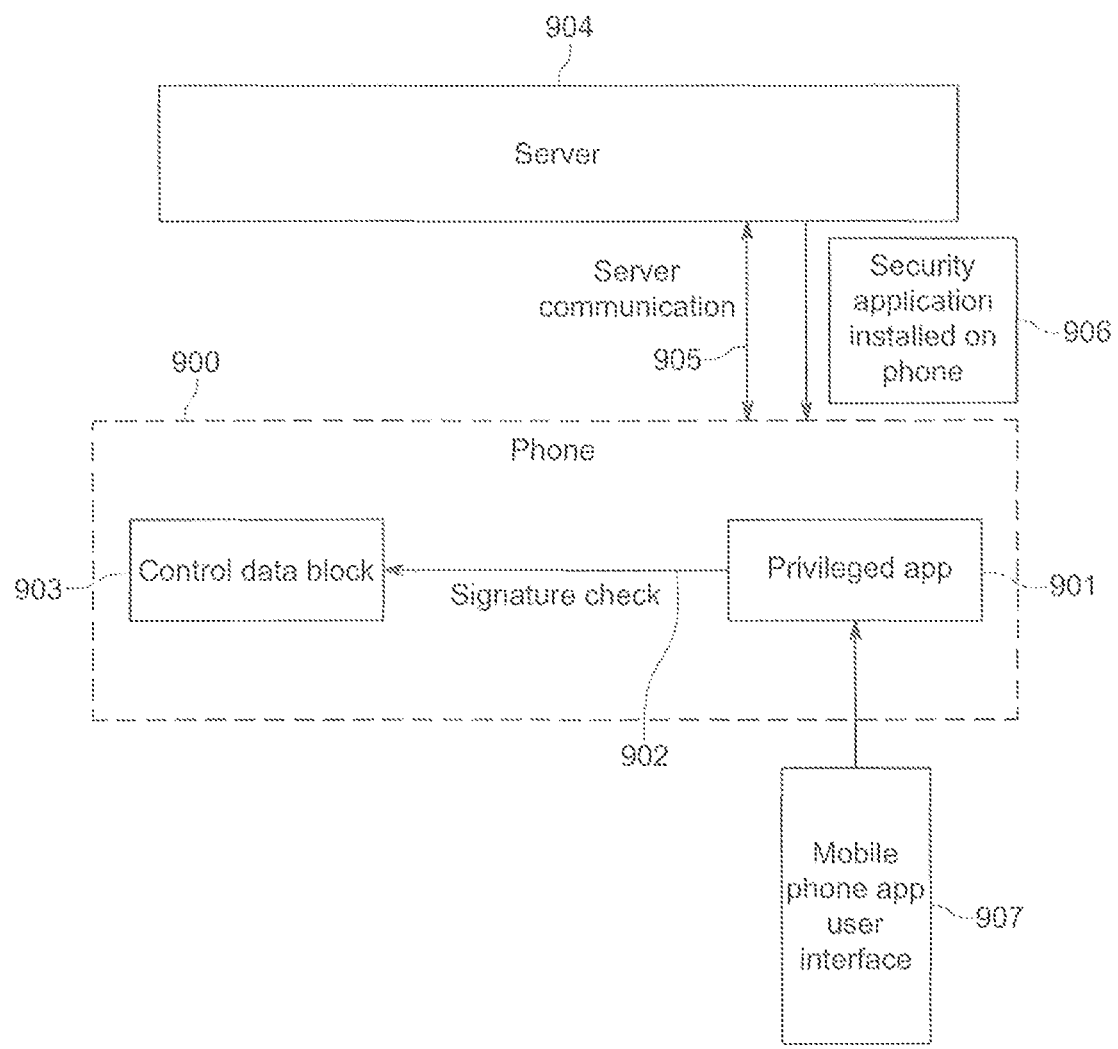
FIG. 9 is a block diagram illustrating an embodiment which enables financing for smart phone users.

FIG. 9 is a block diagram illustrating an embodiment which enables financing for smart phone users. Smartphone 900 is a user's mobile phone. Smartphone 900 hosts privileged app 901, control data Block 903, and security application 906.

Privileged application 901 comprises execution of a process of providing special operating system privileges to install the security application (906) with the required privileges to control the device Signature check 902 is performed by the privileged application 901 to check whether the device is to be controlled. The signature check 902 establishes that the privileged application 901 is authorized to modify the control data block 903. This check is needed because the control data block 903 is a sensitive area of the system. Only the smartphone software (and other authorized applications, typically platform-signed system apps) should be able to access this control data block.

Control data block 903 a series of bytes reserved in a non-resettable protected data area (not erased during "factory reset") that is used to ensure the correct operation of devices that can be controlled by the device software. The privileged application (901) will inspect this data to detect if the device is to be controlled by the software. If the device is eligible for financing, the privileged application (901) will contact the server (904) to download the security application (906). Only the software (and other system apps with specific permissions) has access to the control data block 903. Server 904 is analogous to processor 122 of FIG. 1 that is operated by the provider of the financing method and system being described herein.

Server 904 is trusted by the privileged application (901), which contacts the server 904 to initiate controlling the device. The server 904 downloads the security application (906), which is installed by the privileged application (901) in the correct location on the device. The security application 906 actually controls the device by performing device locking and unlocking.

Server communication 905 is secure communication between the privileged application (901) and the server (904) to initiate download of the security application (906) and to exchange related device and configuration information.

Security application 906 actually locks and unlocks the device based on the information it gets from the server 904 (or device side software) about the repayment performance of the user.

FIGS. 10-16 are screenshots that illustrate a phone lock application according to embodiments. The phone lock application is an element of the security application, which is presented to the customer/user through a user interface provided in this case by PayJoy and illustrated in the Figures. "PayJoy application" refers in general to the user application on the phone that performs the functions described herein and presents the user interface described herein.

Figure 10:
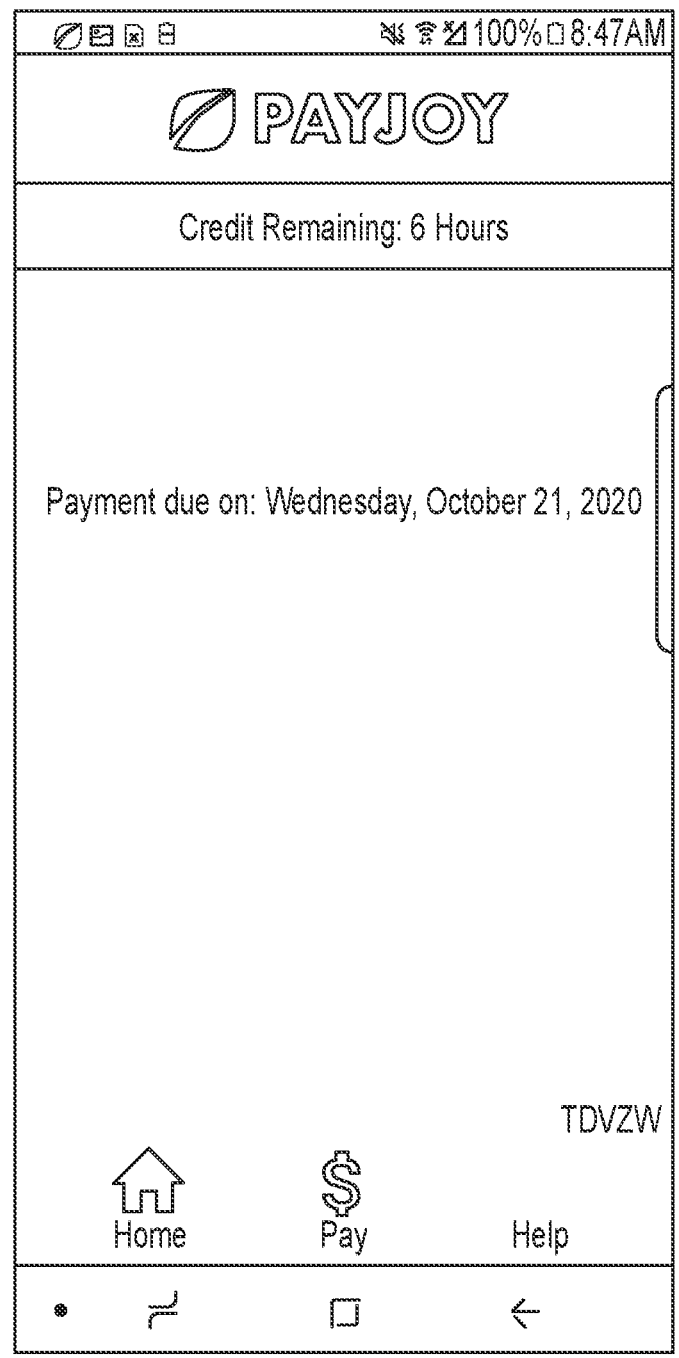
FIG. 10 is a screenshot illustrating a capability of one embodiment.

FIG. 10 is a screenshot that shows the user has 6 hours of credit remaining on the phone. It also shows the payment due date. At the bottom are buttons that allow the user to pay, request help, or navigate to the home page of the PayJoy application. Inactive buttons are greyed out.

Figure 11:
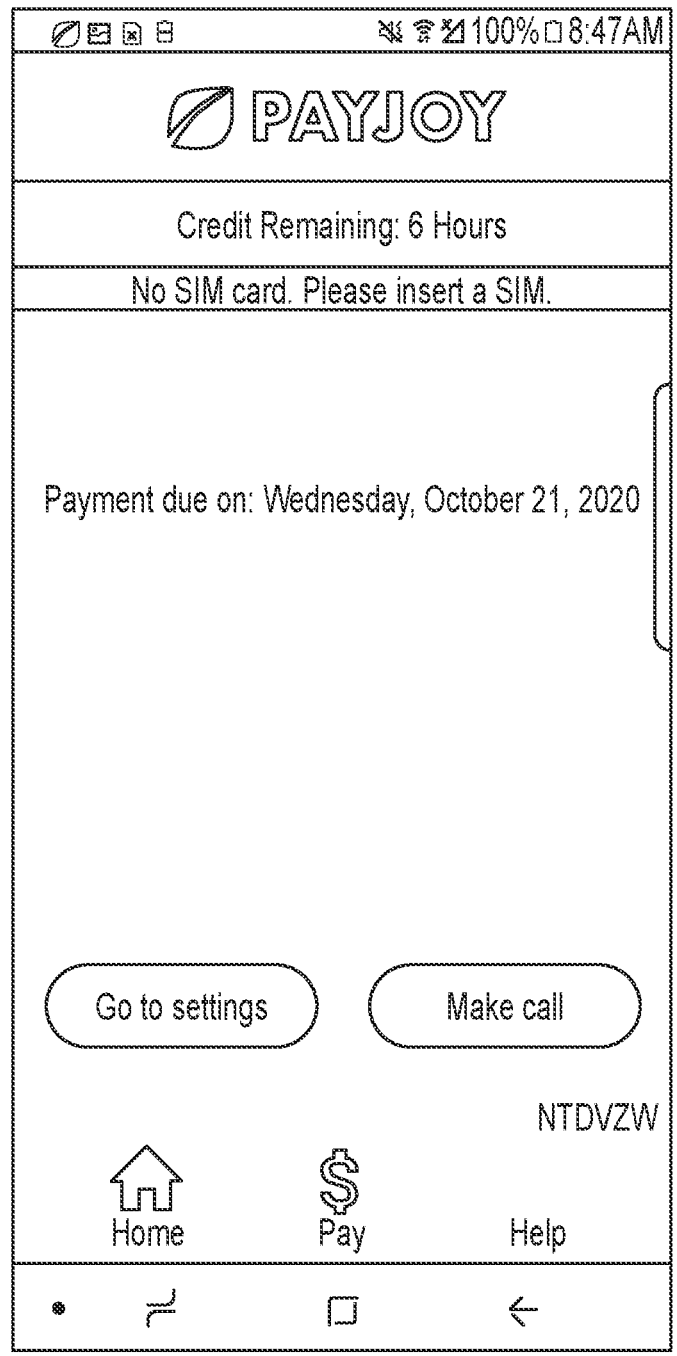
FIG. 11 is a screenshot illustrating a capability of one embodiment.

FIG. 11 is a screenshot that shows the user has 6 hours of credit remaining on the phone. It also shows the payment due date. It also shows that there is no SIM card detected in the phone. The user cannot make a call, but can navigate to "settings". At the bottom are buttons that allow the user to pay, request help, or navigate to the home page of the PayJoy application. Inactive buttons are greyed out.

FIG. 12 is a screenshot that shows the user being requested to make a payment at a nearest PayJoy store. The screen also advises that the phone must be connected to the Internet after the payment is made to ensure that the user's credit is updated. If the user has no access to the Internet, the user is advised to contact support to obtain a code to update the user's credit. At the bottom are buttons that allow the user to pay, request help, or navigate to the home page of the PayJoy application. Inactive buttons are greyed out.

FIG. 13 is a screenshot that shows user options to make an emergency call, to call customer support, or to go to phone settings. At the bottom are buttons that allow the user to pay, request help, or navigate to the home page of the PayJoy application. Inactive buttons are greyed out.

Figure 14:
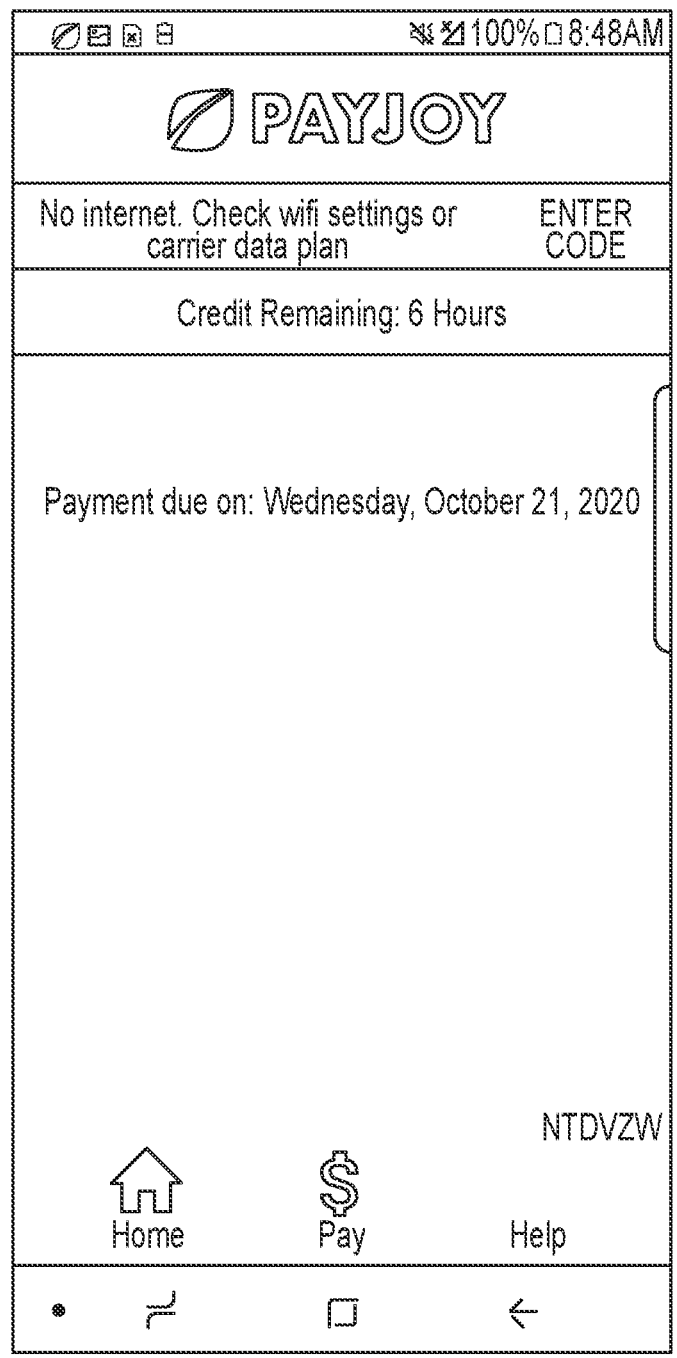
FIG. 14 is a screenshot illustrating a capability of one embodiment.

FIG. 14 is a screenshot that shows the user being notified that there is no Internet service. The user is advised to check WiFi settings or carrier plan data. The user can also click to enter the previously-received code. The user is shown to have 6 hours of credit remaining, and the next payment is due on Oct. 21, 2020. At the bottom are buttons that allow the user to pay, request help, or navigate to the home page of the PayJoy application. Inactive buttons are greyed out.

Figure 15:
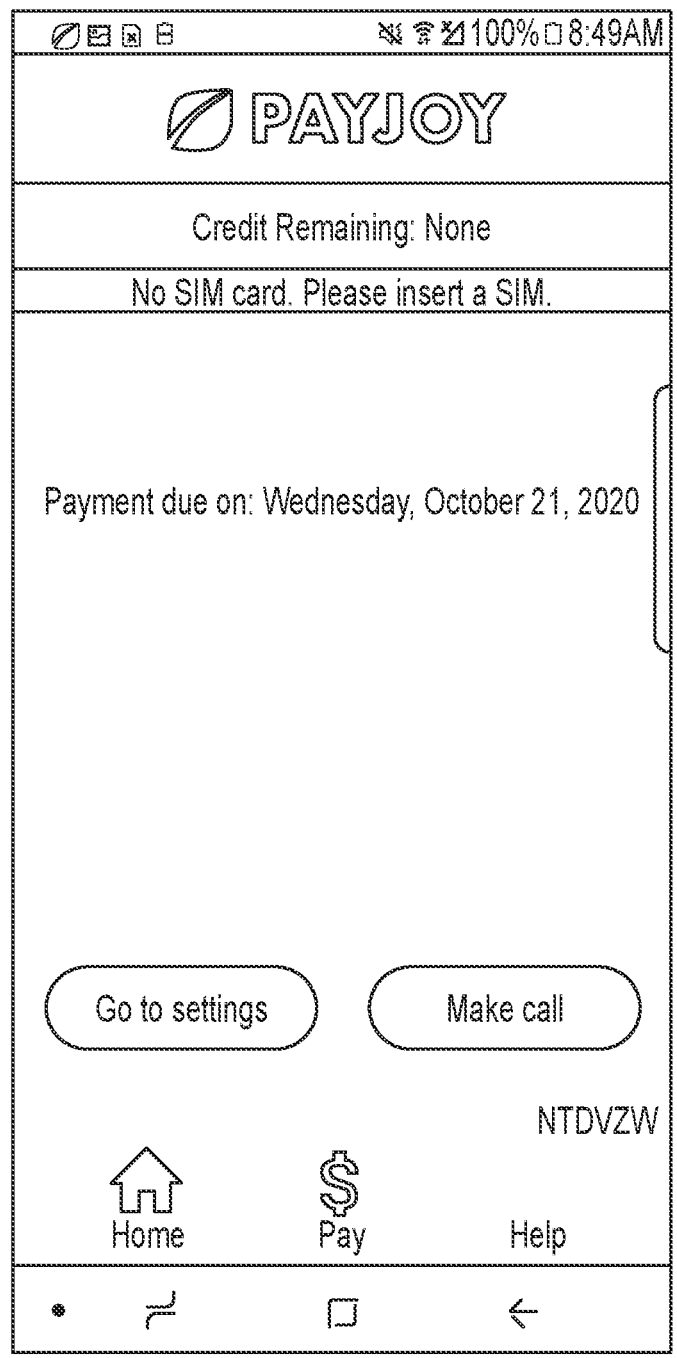
FIG. 15 is a screenshot illustrating a capability of one embodiment.

FIG. 15 is a screenshot that shows the user has no credit remaining. The user is also notified that no SIM card is detected. The payment date for the next payment is shown. At the bottom are buttons that allow the user to pay, request help, or navigate to the home page of the PayJoy application. Inactive buttons are greyed out.

Figure 16:
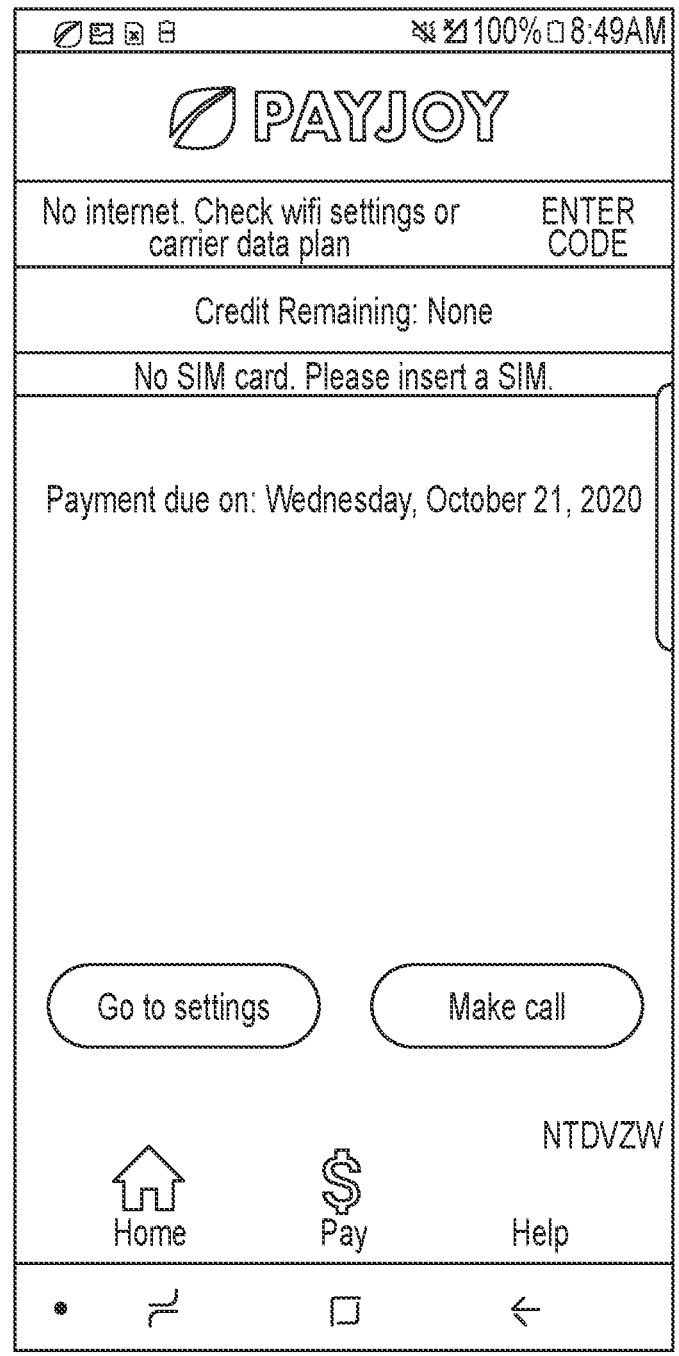
FIG. 16 is a screenshot illustrating a capability of one embodiment.

FIG. 16 is a screenshot that shows the user being notified that there is no Internet service. The user is advised to check WiFi settings or carrier plan data. The user can also click to enter the previously-received code. The user is notified that no SIM card is detected. The user is shown to have no credit remaining, and the next payment is due on Oct. 21, 2020. At the bottom are buttons that allow the user to pay, request help, or navigate to the home page of the PayJoy application. Inactive buttons are greyed out.

Using the structure in FIGS. 1-9, various further embodiments are enabled as described below. These further embodiments are presented to the user through user interface screens similar to those of FIGS. 10-16 as appropriate and can be effectuated through a pay application that sits atop and/or works through the lock application.

According to one embodiment, the phone can be unlocked via code even if the phone should be locked per contract. The customer (user) is allowed a grace period during which they can still use the phone even though they have missed a payment. For example, if the customer has missed their payment so the phone has been locked, the customer can contact the Creditor (e.g. Customer Support whose contact information is in the PayJoy Application. The customer can still use the PayJoy Application even though the phone has been locked) to get a special "Unlock code". The customer enters this code into the PayJoy Application. The PayJoy application authenticates the validity of the code, and unlocks the phone for a given period of time.

In another embodiment, the customer is given a "Lifeline" feature. By tapping on an appropriate button on the user interface, PayJoy application is caused to automatically give the customer a fixed time period for which the phone stays unlocked even though the customer has missed a payment. This is useful if the customer finds themselves in an emergency (e.g. natural disaster, personal safety issue, etc.) where they are unable to place a call to get a code (as in the previous embodiment) but still need access to the phone for a period of time.

Another embodiment is essentially a network lock that locks the phone to a given communications network (e.g. a carrier network or even a Wifi Access point). In addition to locking the phone when the user misses a payment, it always enforce a rule that the phone must only be used for a given communications network. This can enable carriers and other parties to make device financing work in conjunction with other business models. For instance, this may enable the carrier to further reduce the price of financing because they are guaranteed that customers will only use the given phone on their network.

In another embodiment, customers are granted an added period of time before their next payment in return for referrals. For instance, if the customer refers 10 customers to PayJoy, the customer is 10 days of credit before their next payment is due.

In another embodiment, customers may make payments for others such as friends or family. For instance, imagine a customer "co-signs" for a spouse. In this case, the customer can make payments from their phone for the spouse's phone. They would be subject to the terms of device financing. That is, they can choose to have their own phone—or the spouse's phone—locked if they miss a payment. The option of which phone to lock can also be controlled by the creditor who financed the phone.

In another embodiment, the phone is partially locked for non-payment. When the customer misses a payment, instead of locking the entire phone selected features of the phone are disabled. For example, access to chat apps like whatsapp, SMS or video apps like tiktok can be disabled. At the same time, incoming and outgoing phone calls are allowed.

In another embodiment, customers/users qualify for cash back into a mobile wallet after they pay off their loan.

In another embodiment, once the user is proven to reliably pay, the user is extended a line of credit.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)); embedded microprocessors; firmware; software; etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A method for remote management of a communication device, the method comprising:
   a processor of a third party infrastructure wirelessly transmitting a third party operating system (OS) to the communication device, wherein the third party operating system is not pre-installed or pre-loaded on the communication device, and wherein the communication device comprises a mobile phone executing instructions comprising,
      a bootloader program that supports a "lock" command and an "unlock" command; and
      a cryptographic key in firmware;
   the wirelessly transmitted third party OS comprising,
      a privileged application that communicates with the processor of the third party infrastructure and with the communication device, wherein the privileged application provides special operating system privileges to allow installation of,
         a security application with required privileges to control the communication device, wherein the security application communicates with a control data block of the communication device and with the third party infrastructure; and
         a user interface for interacting with a user including a pay application that works through the security application, wherein the pay application communicates with the third party infrastructure and;
   the wirelessly transmitted third party OS controlling the communication device, wherein controlling comprises,
      selectively disabling and enabling the communication device, selectively disabling and enabling certain functions of the communication device;
      executing the "lock" command;
      disabling the "unlock" command by preventing the bootloader program from executing an "unlock" command call;
      preventing a user from tampering with control software of the communication device;
      altering binary code of the bootloader program of the communication device to prevent the bootloader program from receiving new software packages and preventing the user from altering or overwriting the third party OS; and
   wherein the pay application further interacts with the user, including,
      the processor of the third party infrastructure through the third party operating system presenting to the user on a display of the communication device that the communication device lacks a SIM card, and displaying buttons that allow the user to pay, request help, or navigate to a home page of an application administered by the entity that installed the third party OS;
      the processor of the third party infrastructure through the third party operating system presenting to the user on a display of the communication device that the communication device must be connected to the internet after a payment is made to ensure that the user's credit is updated; and if the user has no access to the internet, the processor of the third party infrastructure through the third party operating system presenting to the user on a display of the communication device that the user may contact support by pressing a "call customer support" button on the communication device to obtain a code that allows the user to update their credit, wherein the user then may enter the code to cause the communication device to display credit remaining and next payment due date.

2. The method of claim 1, wherein the privileged application and the security application enable a user of the communication device to apply for financial credit while using control of the communication device as collateral.

3. The method of claim 1, wherein controlling the communication device further comprises altering a cryptographic key in firmware of the communication device such that the cryptographic key in firmware of the communication device no longer matches a cryptographic key of the third party OS.

4. The method of claim 1, wherein the user interface further enables the user to:
  pay using the communication device;
  receive a request to make a payment at a store; and
  request help.

5. The method of claim 1, wherein the user interface further notifies the user that:
  no Internet service is detected; and
  the user is advised to check WiFi settings and carrier data plan.

6. The method of claim 1, wherein the user interface further enables the user to:
  make an emergency call; and
  make a call to customer support.

7. The method of claim 1, wherein the user interface further enables the user to enter an obtained code to access additional functions of the communication device even though the communication device has been locked, wherein the code is obtained by the user from a customer support contact that is active on the communication device.

8. The method of claim 1, wherein the user interface further enables the user to access a lifeline feature that causes the communication device to be temporarily activated even when the communication device has been inactivated for lack of payment.

9. The method of claim 1, wherein the security application locks the communication device to a particular communications network.

10. The method of claim 1, wherein the user interface further enables the user to make payments for other users that share an account with the user.

11. The method of claim 1, wherein the security application locks selected features of the communication device, including various phone apps, while allowing incoming and outgoing phone calls.

* * * * *